(12) United States Patent
Edwards et al.

(10) Patent No.: US 9,155,254 B2
(45) Date of Patent: Oct. 13, 2015

(54) INDEPENDENT CONTROL OF TWO SOLENOID OPERATED VALVES OVER TWO WIRES IN AN IRRIGATION SYSTEM

(75) Inventors: Walter John Edwards, Floreat (AU); Michael Barrington Wood, Mount Lawley (AU)

(73) Assignee: Bookleaf Pty Ltd, Osborne Park (AU)

( * ) Notice: Subject to any disclaimer, the term of this patent is extended or adjusted under 35 U.S.C. 154(b) by 759 days.

(21) Appl. No.: 13/304,689

(22) Filed: Nov. 28, 2011

(65) Prior Publication Data

US 2012/0299379 A1    Nov. 29, 2012

(51) Int. Cl.
*H02J 1/08*    (2006.01)
*A01G 25/16*    (2006.01)

(52) U.S. Cl.
CPC .............. *A01G 25/16* (2013.01); *Y10T 307/469* (2015.04)

(58) Field of Classification Search
USPC ............................................................ 307/12
See application file for complete search history.

(56) References Cited

U.S. PATENT DOCUMENTS

| 3,242,318 | A | * | 3/1966 | Guiver ........................... 235/474 |
| 3,729,710 | A |  | 4/1973 | Sherwin |
| 3,755,686 | A |  | 8/1973 | Woods |
| 3,906,294 | A |  | 9/1975 | Lourigan |
| 3,961,753 | A | * | 6/1976 | Sears ............................... 239/64 |
| 4,131,882 | A | * | 12/1978 | Hollabaugh et al. ....... 340/12.33 |
| 4,190,884 | A |  | 2/1980 | Medina |
| 4,215,276 | A |  | 7/1980 | Janeway |
| 4,348,582 | A |  | 9/1982 | Budek |
| 4,356,402 | A |  | 10/1982 | Morimoto |
| 4,575,004 | A |  | 3/1986 | Geiger |
| 5,748,466 | A | * | 5/1998 | McGivern et al. .............. 700/17 |
| 5,780,938 | A | * | 7/1998 | Edwards .......................... 307/18 |
| 2003/0147264 | A1 | * | 8/2003 | Jinno ............................... 363/20 |
| 2011/0232770 | A1 | * | 9/2011 | Baggett ........................... 137/12 |

* cited by examiner

*Primary Examiner* — Jared Fureman
*Assistant Examiner* — Duc M Pham

(57) ABSTRACT

Apparatus 11 and 13 for interfacing two AC sources with two AC loads 17a 17b in the form of solenoid operated valves over a single conductor 25, with a return conductor 19 in an irrigation system is disclosed. The apparatus has an encoder circuit 11 with two inputs 21a 21b for connection to the two AC sources, and an output 23 for connection to the single conductor 25, and a decoder circuit 13 having an input 27 for connection to the conductor 25, and two outputs 29a 29b for connection to loads 17a 17b respectively. When the first input 21a is powered, the first load 17a will be switched on, and when the second input 21b is powered, the second load 17b will be switched on. The decoder portion 13 incorporates switching circuits 43a 43b, interfaced with turn on delay timers 45a 45b respectively, to delay operating the loads at switch on, and turn-off delay timers 47a 47b to hold the loads on after switch off.

20 Claims, 2 Drawing Sheets

INDEPENDENT CONTROL OF TWO SOLENOID OPERATED VALVES OVER TWO WIRES IN AN IRRIGATION SYSTEM

FIELD OF THE INVENTION

This invention relates to a duplexing encoder/decoder pair for alternating current systems, in general, and to a system for operating two loads independently, from two independent current sources and a single return, while using two conductors to connect the current sources and return to the loads, in particular. The invention has particular, but not exclusive, application in the field of automatic sprinkler systems comprising a number of solenoid valves electrically connected to an irrigation controller for the timing and switching thereof.

Throughout the specification unless the context requires otherwise, the word "comprise" or variations such as "comprises" or "comprising", will be understood to imply the inclusion of a stated integer or group of integers but not the exclusion of any other integer or group of integers.

Throughout the specification unless the context requires otherwise, the word "include" or variations such as "includes" or "including", will be understood to imply the inclusion of a stated integer or group of integers but not the exclusion of any other integer or group of integers.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

The solenoid valves utilized in such automatic sprinkler systems require energization of the solenoid to operate the valve. Most solenoids used in this application are actuated and held by a 24 volt AC current supplied by the irrigation controller. Typically, one conductor (common) is required to connect each load (solenoid) to each switched current source (output) of the irrigation controller, and one conductor is required to connect the return from all of the loads to the irrigation controller.

In an existing automatic sprinkler system installation, the solenoid operated valves are usually located below ground, and electrical cabling connecting the solenoid operated valves to a reticulation controller will usually be buried underground. When it is desired to add an additional solenoid operated valve, usually there will not be sufficient cabling as the system will have been originally installed with only the required cabling, and without any capacity for expansion.

A previous attempt has been made to operate two independent AC loads from two independent current sources and a return utilizing two conductors to interconnect the current sources and return with the alternating current loads. This product is manufactured by Transitional Systems Manufacturing Company of West Sacramento, Calif., under the trademark "Doubler" and is described in U.S. Pat. No. 4,575,004. The apparatus described in U.S. Pat. No. 4,575,004 is a complex mechanical device incorporating latching switching means, viz. electromechanical latching relays. When this apparatus is used it increases the electrical load on the circuit over and above that formerly presented by the solenoid or solenoids connected in parallel to the irrigation controller. Moreover, such electromechanical relays are subject to malfunction and/or failure over extended periods of time. In addition, the apparatus described in U.S. Pat. No. 4,575,004 cannot be used to switch between two alternating current loads connected thereto unless there is a delay between the first alternating current load being switched off and the second alternating current load being energized. Thus, in most modern irrigation controllers, the apparatus described in U.S. Pat. No. 4,575,004 could not be used to switch between adjacent outputs to solenoid valves in the switching sequence of the irrigation controller.

Another system for operating two independent AC loads from two independent current sources and a return utilizing two conductors to interconnect the current sources and return with the alternating current loads is described in U.S. Pat. No. 5,780,938. A difficulty with this system is that with modern irrigation controllers incorporating monitoring of outputs to solenoid valves, this has resulted in outputs cutting out due to over-current, or outputs being skipped, due to the irrigation controller falsely detecting a fault condition.

DISCLOSURE OF THE INVENTION

It is an object of the invention to provide a device which overcomes the aforementioned difficulties.

In accordance with one aspect of the present invention there is provided apparatus to allow independent control of a first load and a second load in the form of solenoid operated valves in an irrigation system via a single conductor with a single common return. The apparatus comprises an encoder circuit locatable in use proximal to an irrigation controller, and a decoder circuit locatable adjacent to said solenoid operated valves, the encoder circuit having a first input for connection to a first irrigation controller output, and a second input for connection to a second irrigation controller output, and an output for connection to the single conductor. The apparatus also comprises a decoder circuit having an input for connection to the single conductor, a first output for connection to the first load and a second output for connection to the second load. When the first input is energised, the first output will be energised, and when the first input is de-energised the first output will be de-energised and when the second input is energised, the second output will be energised, and when the second input is de-energised the second output will be de-energised.

The decoder circuit also incorporates a first switching circuit between said input and said first output, interfaced with a first turn on delay timer to time out a predetermined period before operating said first switching circuit, and a second switching circuit between said input and said second output, interfaced with a second turn on delay timer to time out a predetermined period before operating said second switching circuit.

In this manner, viewing the circuit arrangement current flow using the conventional current convention, a positive going voltage at the first decoder input will be available at the first decoder output but only after the predetermined period has timed out, and a negative going voltage at the second encoder input will be available at the second decoder output but only after the predetermined period has timed out. Conversely, negative going voltage at the first encoder input and a positive going voltage at the second encoder input will be blocked. As will be appreciated, a return conductor will be required between the loads and the return of the current supply.

The first decoder output and the second decoder output each include associated therewith a turn-off delay circuit. Alternatively, the turn-off delay circuit may be associated with the load, or turn-off delay may be inherent in the physical design of the load, particularly where the load is inductive. In one arrangement the first decoder output and the second decoder output each include an inductive turn-off delay circuit. In a preferred embodiment the turn-off delay circuit comprises from each output to common, an LC snubber circuit.

In a particularly preferred and advantageous arrangement each turn-off delay circuit comprises a diode and capacitor connected in parallel, connected in series with an inductor, which when in circuit is connected across the load which is connected to the relevant output.

For a solenoid operated valve which is intended to operate on 24 volts AC, the value of the capacitor can range from 4.7 µF to 22 µF and the value of the inductor can range from 50 µH to 300 µH. Generally, the higher value the capacitor is, the higher value of inductor is used. Typically, where a capacitor of 10 µF is used, an inductor of 100 µH is suitable. The turn-off delay circuit preferably delays turn off of the relevant output by holding the output high for a period of at least 0.015 seconds. Preferably the turn-off delay circuit delays turn off of the relevant output by holding the output high for a period of at least 0.015 seconds. While the turn off delay could be longer, this would increase the probability of two outputs being operational at the same time, which could interfere with operation of a reticulation system, especially where there is low pressure monitoring and trip out.

The first switching circuit and the second switching circuit each preferably use a low gate current triac. Typical gate currents may be less than 15 mA, or preferably less than about 10,A. The low gate current triac is preferably capable of switching with gate currents as low as 5 mA. Preferably the low gate current triac can switch in all four quadrants.

The first turn on delay timer to time out a predetermined period before operating said first switching circuit and the second turn on delay timer to time out a predetermined period before operating said second switching circuit may each be a transistor based RC timer circuit.

Preferably the first turn on delay timer and the second turn on delay timer each provide a turn on delay of at least 0.1 seconds, and most preferably a turn on delay of about 0.5 seconds. This equates to five 50 Hz cycles or six 60 Hz cycles as a minimum, and 25 50 Hz cycles or 30 60 Hz cycles as an optimum. While the turn on delay could be longer, this increases the time that an output might not be operating, which in an irrigation application may interfere with normal operation, especially if there is high pressure trip out protection, for example.

Preferably the duplex encoder/decoder pair employs diode means to control the conduction direction of electrical current therethrough.

In accordance with a second aspect of the invention there is provided a decoder half for a duplex decoder, for use with a duplex encoder, said duplex decoder half having an input connecting to a half wave rectifier having a half wave rectified output, said half wave rectified output leading to a switching circuit interfaced with a turn on delay timer to time out a predetermined period before operating said switching circuit on said half wave rectifier passing current at an operational voltage, the output of the switching circuit connecting to an output for connecting to a load and to a turn-off delay circuit.

In accordance with a third aspect of the invention there is provided, an irrigation system solenoid operated valve control circuit, said control circuit having an input connecting to a half wave rectifier having a half wave rectified output, said half wave rectified output leading to a switching circuit interfaced with a turn on delay timer to time out a predetermined period before operating said switching circuit on said half wave rectifier passing current at an operational voltage, the output of the switching circuit connecting to an output for connecting to a solenoid of said solenoid operated valve, where the output includes associated therewith a turn-off delay circuit.

The turn off delay circuit may advantageously be an inductive turn-off delay circuit, and in a more preferred embodiment the turn-off delay circuit comprises from the output to common, an LC snubber circuit.

In a particularly preferred and advantageous arrangement the turn-off delay circuit comprises a diode and capacitor connected in parallel, connected in series with an inductor, which when in circuit is connected across the load which is connected to the relevant output.

For a solenoid operated valve which is intended to operate on 24 volts AC, the value of the capacitor can range from 4.7 µF to 22 µF and the value of the inductor can range from 50 µH to 300 µH. Generally, the higher value the capacitor is, the higher value of inductor is used. Typically, where a capacitor of 10 µF is used, an inductor of 100 µH is suitable. The turn-off delay circuit preferably delays turn off of the relevant output by holding the output high for a period of at least 0.015 seconds. Preferably the turn-off delay circuit delays turn off of the relevant output by holding the output high for a period of at least 0.015 seconds. While the turn off delay could be longer, this would increase the probability of two outputs being operational at the same time, which could interfere with operation of a reticulation system, especially where there is low pressure monitoring and trip out.

The switching circuit preferably uses a low gate current triac. This low gate current triac is preferably capable of switching with gate currents as low as 5 mA. Preferably the low gate current triac can switch in all four quadrants.

The turn on delay timer to time out a predetermined period before operating said switching circuit may be a transistor based RC timer circuit.

Preferably the turn on delay timer provides a turn on delay of at least 0.1 seconds, and most preferably a turn on delay of about 0.5 seconds. This equates to five 50 Hz cycles or six 60 Hz cycles as a minimum, and 25 50 Hz cycles or 30 60 Hz cycles as an optimum. While the turn on delay could be longer, this increases the time that an output may not be operating, which in an irrigation application may interfere with normal operation, especially if there is high pressure trip out protection, for example.

In accordance with another aspect of the present invention, there is provided a method of independently controlling two loads connected to two power supplies by a source conductor and a return conductor, comprising connecting an encoder portion as described above between a source conductor and the power supplies, and connecting a decoder portion as described above between a source conductor and the loads.

In accordance with a further aspect of the invention, there is provided a method of independently controlling two loads connected to two alternating current power supplies by a source conductor and a return conductor. The method and apparatus comprises allowing only the positive going voltage from one power supply to reach one load while blocking the negative going voltage from the one power supply reaching the source conductor. Conversely, this method and apparatus comprises allowing only the negative going voltage from a second power supply to reach a second load while blocking the positive going voltage from reaching the source conductor. Also, the method prevents negative going voltage from reaching the one load from the source conductor and preventing positive going voltage from reaching the other load from the source conductor. The method provides a turn on delay for each of the first and second loads, and a turn-off delay for each of the first and second loads.

BRIEF DESCRIPTION OF THE DRAWINGS

A preferred embodiment of the present invention being a duplex encoder/decoder pair for controlling separate operation of two solenoid operated valves over two wires will now be described with reference to the drawings in which.

BEST MODE(S) FOR CARRYING OUT THE INVENTION

Figure 1:
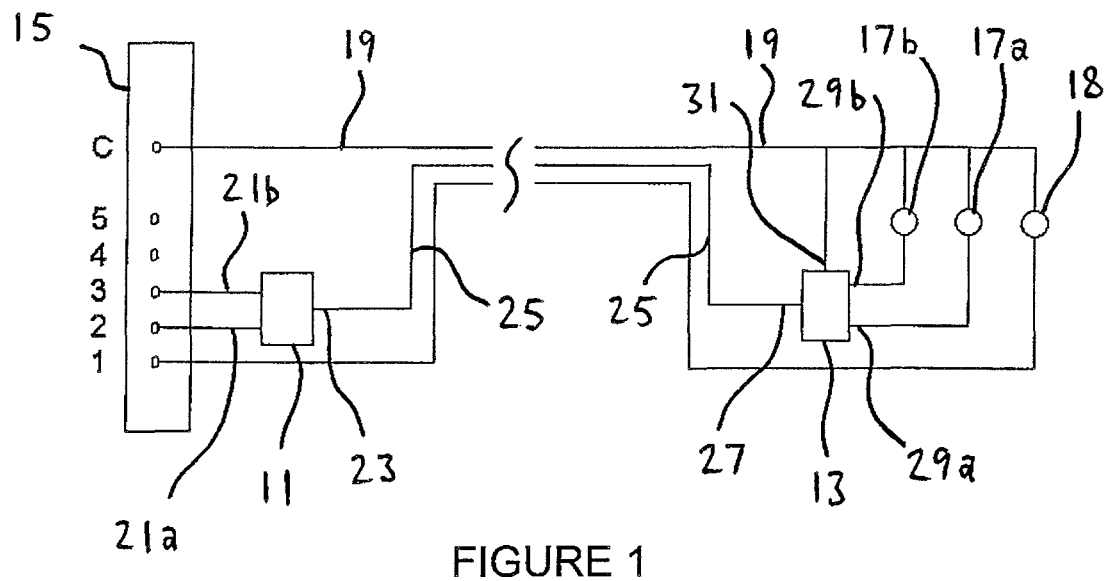
FIG. 1 is a block schematic showing a duplex encoder/decoder pair for controlling separate operation of two solenoid operated valves over two wires.
Figure 2:
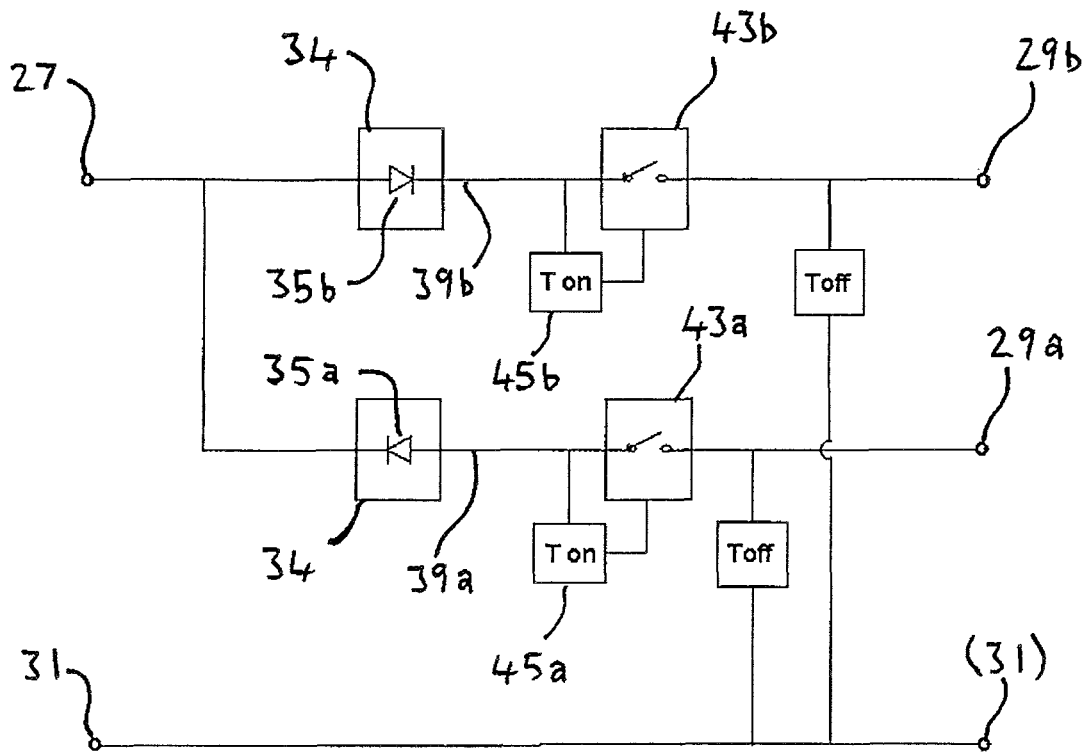
FIG. 2 is a block schematic showing circuits present in the duplex decoder circuit of the embodiment.
Figure 3:
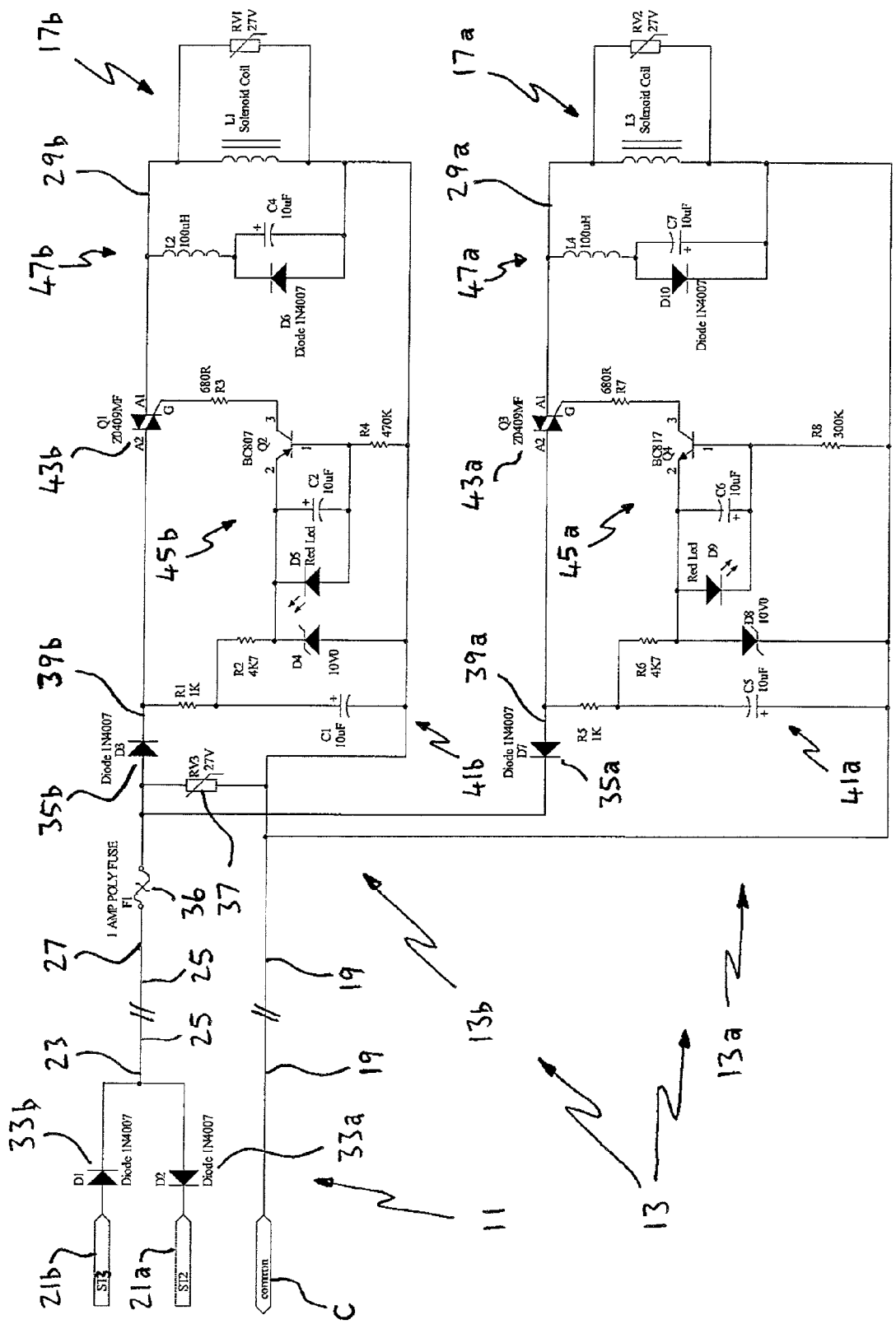
FIG. 3 is a circuit diagram of duplex encoder/decoder pair.

The invention is described relative to a specific embodiment thereof given with reference to the drawing which is a circuit schematic of a duplex encoder/decoder pair for use in an automatic sprinkler system for watering gardens, lawns and the like. The particular application is directed to the addition of an additional watering zone controlled through an additional solenoid operated valve, to an existing system without the necessity of extensive digging and/or trenching to run control wires. Other applications of the system are contemplated.

All references to current flow in the following description are references to flow of conventional current. That is, current flow is from a higher to a lower potential, including from a higher positive potential to a lower positive potential or a negative potential, or from a less negative potential to a more negative potential.

The embodiment is directed towards a duplexing encoder/decoder pair comprising an encoder circuit 11 and a decoder circuit 13 connected between an irrigation controller 15 and first and second loads in the form of solenoid valves 17a and 17b, respectively. Typically, one of the solenoid valves, e.g. valve 17a, is in place while the other solenoid valve, e.g. valve 17b, is to be added. Solenoid valve 18 which was already in place, is shown connected to station output 1, but otherwise plays no part in the embodiment.

Referring to the irrigation controller 15 only the water zone or station output current sources for stations 1-5 inclusive are shown, together with the connection C for the return conductor 19. Other portions of a typical controller are omitted from this description for convenience.

The encoder circuit 11 has its inputs 21a and 21b connected to station outputs 2 and 3 of the irrigation controller 15. The station outputs 2 and 3 represent current sources connected thereto. The output 23 of the encoder circuit 11 is connected to one end of a single conductor 25 which would have been, prior to modification of the irrigation system, typically connected already to the existing solenoid 17a.

The other end of conductor 25, in this system is re-connected to the single input 27 of decoder circuit 13. The decoder circuit 13 has two outputs 29a and 29b which are connected to the solenoid valves 17a and 17b, respectively. The decoder circuit 13 also has a common connection 31 which is connected to the return conductor 19 together with the return connections of the solenoid valves 17a and 17b.

In a preferred embodiment, the encoder circuit 11 comprises a pair of diodes 33a and 33b. Diode 33a has the cathode thereof connected to input 21a. Conversely, diode 33b has the anode thereof connected to input 21b. The other terminals of diodes 33a and 33b are connected together and to the encoder output 23.

Similarly, the decoder circuit 13 comprises two half wave rectifiers 34 each in the form of a diode 35a and 35b connected in a similar fashion to the diodes 33a and 33b. Diode 35a has its cathode connected to the anode of diode 35b and connected to input 27 of decoder circuit 13 via a 1 amp poly fuse 36, and a 27 volt 7 mm varistor 37 which acts as a voltage clamp to dissipate any voltage spikes that reach the decoder circuit 13. The poly fuse heats up when a fault occurs and increases it's internal resistance until the load becomes balanced. Once the fault is removed the poly fuse cools down and again allows current to flow. The varistor is used to clamp the input cable 25 and to capture any power spikes before they enter the decoder. The varistor also acts as a terminator for the field cable 25 and helps with lightning and other conduction that would normally cause failure of the irrigation controller.

In conventional fashion, the irrigation controller 15 provides timing and switching of, typically, 24 volts AC at any one of the terminals 1 through 5 (or more, not shown). The AC voltage is measured between respective terminals and the common connection C. When 24 volts AC is provided between terminal 2 and common connection C, the voltage is half wave rectified by diode 33a to produce a voltage waveform the encoder output 23 which is at negative potential relative to the return conductor 19. This voltage is supplied to decoder 13 via conductor 25. In the decoder circuit 13 the diode 35a conducts, resulting a negative voltage being available at half wave rectifier 34 output 39a.

Conversely, when 24 volts AC appears between terminal 3 and common connection C, this voltage signal is half wave rectified by diode 33b to produce a positive potential at the encoder output 23 relative to the return conductor 19. This voltage is supplied to decoder 13 via conductor 25. Thus, the diode 35b is rendered conductive, resulting in a positive voltage being available at half wave rectifier 34 output 39b.

The decoder 13 comprises two mirror circuits being a positive half decoder circuit 13b and a negative half decoder circuit 13a.

The output 39a of the half wave rectifier 34 formed by diode 35a is connected to a DC voltage regulator 41a and to a switching circuit 43a formed by a triac Q1. The DC voltage regulator 41a is formed by resistors R1, R2, capacitor C1 and zener diode D4. The DC voltage regulator 41a supplies a ten volt reference voltage to a turn-on timer circuit 45a formed by transistor Q2, resistor R4, capacitor C2 and a red light emitting diode D5.

Similarly the output 39b of the half wave rectifier 34 formed by diode 35b is connected to a DC voltage regulator 41b and to a switching circuit 43b formed by a triac Q3. The DC voltage regulator 41b is formed by resistors R1, R6, capacitor C5 and zener diode D8. The DC voltage regulator 41b supplies a ten volt reference voltage to a turn-on timer circuit 45b formed by transistor Q4, resistor R8, capacitor C6 and a red light emitting diode D9.

The triacs forming the switching circuits 43a and 43b are Z0409MF types, which are low gate current 4 amp triacs. These triacs are a little unusual in that in all quadrants they switch at 5 mA gate current. This is a useful property, allowing the decoder circuit formed by both triacs and associated parts to use all four quadrants to switch. For equal switching times it is important to be able to maintain equal switching currents.

When power is supplied at the output 39b or 39a of either half wave rectifier 34, in the turn on timer circuits 45a and 45b, the red light emitting diode D5 or D9 passes a known current when reverse biased. This current is used to control the charging of capacitor C2 or C6. When the voltage at the base of transistor Q4 reaches −0.6V to that of the voltage on the emitter of transistor Q4, transistor Q4 starts to conduct and turns on the triac 43a. Similarly, when the voltage at the base of transistor Q2 reaches +0.6V to that of the voltage on the emitter of transistor Q2, transistor Q2 starts to conduct and turns on the triac 43b.

This timer circuit 45a or 45b with the components illustrated and in particular with the capacitor values shown, results in a turn-on delay of about half a second from when power is supplied to input 27 to the time that the relevant triac switching circuit 43a or 43b turns on.

A turn-off delay circuit 47a is formed by inductor L4, capacitor C7 and diode D10 and is in circuit across the output 29a and the common C or return, and in circuit across the coil L3 of the solenoid valve 17a. Similarly, a turn-off delay circuit 47b is formed by inductor L2, capacitor C4 and diode D6, in circuit across the output 29a and the common C or return, in circuit across the coil L1 of the solenoid valve 17b.

The turn-off delay circuits 47a and 47b function as both a smoothing network for the DC signal passed through Triac Q1 and also a snubber network that clamps and dissipates the energy that is held in the coils L3 and L1 of the solenoid valves 17a or 17b when the power is removed. This is important as the triac Q3 or Q1 is latched hard on, and because it is bi directional the collapsing field of the coil L3 or L1 of the solenoid valves 17a or 17b can pass through the triac Q3 or Q1 when the power is removed and cause high inverted currents to exist in the conductor 25. These high signals can cause electronic fuses to trip and make it difficult for channels of the two up to be side by side.

When power is switched by the triac Q1, the triac passes half wave DC through L2 and charges up C4, in addition to actuating coil L1 of the solenoid valve 17b. This LC network of L2 and C4 provides enough smoothing so that the half wave signal being applied to the 24 VAC coil L3 of the solenoid valve 17b does not chatter.

A 27 volt varistor 49b is provided across the turn off delay circuit 47b and across the coil L1 of the solenoid valve 17b to capture any high current pulses that occur when the current to coil L1 turns off and the coil field collapses. All other field currents below the varistors clamping voltage are loaded into L2 and used to hold the charge in capacitor C4. Doide D6 which is in parallel with capacitor C4 acts as a free wheeling diode. When the station 3 of the reticulation controller is turned off and the power to the solenoid is removed there is a collapsing field generated by the coil L1 of the solenoid valve 17b. This field needs to be dissipated and controlled, otherwise it might pass back through the triac and cause spikes on the conductor 25. The collapsing field is captured via inductor L2 and capacitor C4 and is then shorted out via the flyback diode D6. The result of this circuit is that once the triac 43a or 43b is actuated, the coil L3 or L1 of solenoid 17a or 17b latches hard on, and will not release until operational voltage and current ceases to flow through the half wave rectifier 35a or 35b, and until the reactive current in the coils L3 and L4 or L1 and L2 is dissipated. This process is completed within three AC half cycles, with the component values shown.

The negative side 13a of the decoder circuit 13 works in an identical fashion.

As can be seen with this arrangement, the two solenoid valves 17a and 17b may be independently operated from the irrigation controller 15 through the single conductor 25 and the return conductor 19. Without the use of the duplex encoder/decoder pair, it would be necessary to provide three separate conductors between the two solenoid valves 17a and 17b, the output connections 2 and 3 and common connection C of the irrigation controller 15.

In addition to this, if both signals are on then full wave AC flows, and this results in the decoder seeing both valves as being active and turns them on. This is an important feature as it means that it is possible to set up retrofits using a master valve and a station valve. Other devices on the market do not allow this type of interface.

Use of the duplex encoder/decoder pair offers significant advantages in two areas. The first is a cost saving where exceptionally long runs of wiring are required between an irrigation controller and solenoid valves. However, the major advantage is that apart from any effort required to connect the encoder and decoder circuits, existing irrigation systems can be extended by adding a watering zone, without having to dig up existing wiring or dig trenches to add further wiring to provide connection between the new solenoid valve and the existing irrigation controller. That is, the additional sprinkler unit is merely added to an existing unit and the encoder and decoder circuits are installed.

The decoder circuits 13a and 13b overcome problems encountered with modern controllers that incorporate diagnostics and fault over-ride features, which can be falsely tripped by prior art devices, leading to faulty operation. The turn-on delay implemented in the decoder circuit 13 provides a soft start mechanism so that the two valves being controlled don't electrically change quickly and hence this limits inrush current and the chances of the electronic fuse in the controller from tripping. The turn-off delay implemented in the decoder circuit 13 provides a soft shutdown mechanism at the valve end that does not let the collapsing energy field in the coil pass back to the control system thus eliminating random electronic fuse tripping. The decoder circuit also provides a booster mechanism that acts like a capacitive discharge system, which means that the inrush current to pull a valve coil in is lowered and the holding current is all that needs to be handled by the cabling. The effect of this is to help in a situation when cable and the connections are failing or not up to scratch. Also provided is Lightning protection at the valve and also for the cabling back to the irrigation controller, and on the multiplex control cable and Electronic fuse protection to limit fault conditions at the decoder end causing damage to the controller or the cabling.

In a preferred embodiment, the components contained within both the encoder 11 and the decoder 13 should be encapsulated in a watertight, waterproof housing so that the decoder circuit 13 may be buried in the ground, along with the associated solenoid valves 17a and 17b. The encoder is then disposed adjacent to the control unit.

In yet a further embodiment, the positive half decoder circuit 13b or negative half decoder circuit 13a could be built into or encapsulated with a solenoid coil. In this manner either would operate normally on a supplied 24 volt AC supply, or one of each could be used with an encoder circuit 11 as described.

The embodiment presented has been designed to be most economical and cost effective. Changes could be made to achieve the same result, for example by changing the triac to a silicon controlled rectifier or other transistor based circuit, or even a mechanical relay, and using a different circuit to achieve the turn-on timer function such as a 555 timer, a Schmitt trigger CMOS circuit or even a microprocessor, although these are considered to be clumsy implementations.

It should be appreciated that the scope of the invention is not limited to the embodiment described herein. In particular, the invention has application in other areas besides use in automatic sprinkler systems. The invention would prove equally suitable for use in any application utilizing one or more AC supplies and one or more AC loads which are operable on half wave rectified power supplies.

Thus, there is shown and described a unique design and concept of duplex encoder/decoder unit for alternating current systems. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A duplex encoder/decoder pair for interfacing a first current source and a second current source with a first load and a second load over a single conductor, comprising an encoder portion having a first input for connection to said first current source, and a second input for connection to said second current source, and an output for connection to the single conductor, and comprising a decoder portion having an input for connection to the conductor, a first output for connection to a first load and a second output for connection to a second load, where the encoder portion is adapted for selectively conducting current from the first encoder input to the encoder output and alternatively the encoder output to the second encoder input, and the decoder portion is adapted for selectively conducting current only from the decoder input to the first decoder output and alternatively from the second decoder output to the decoder input, the decoder portion also incorporates a first switching circuit between said input and said first output, interfaced with a first turn on delay timer to time out a predetermined period before operating said first switching circuit, and a second switching circuit between said input and said second output, interfaced with a second turn on delay timer to time out a predetermined period before operating said second switching circuit, the first decoder output and the second decoder output each including a turn-off delay circuit, each turn-off delay circuit comprising a diode and capacitor connected in parallel, connected in series with an inductor, which when in circuit is connected across the load which is connected to the relevant output.

2. A duplex encoder/decoder pair as claimed in claim 1 wherein the value of the capacitor and the value of the inductor are selected to delay turn off of the relevant output by holding the output high for a period of at least 0.015 seconds.

3. A duplex encoder/decoder pair as claimed in claim 1 wherein the first switching circuit and the second switching circuit each use a low gate current triac.

4. A duplex encoder/decoder pair as claimed in claim 3 wherein the low gate current triac is capable of switching with gate currents as low as 5 mA.

5. A duplex encoder/decoder pair as claimed in claim 3 wherein the low gate current triac can switch in all four quadrants.

6. A duplex encoder/decoder pair as claimed in claim 1 wherein the first turn on delay timer to time out a predetermined period before operating said first switching circuit and the second turn on delay timer to time out a predetermined period before operating said second switching circuit are each a transistor based RC timer circuit.

7. A duplex encoder/decoder pair as claimed in claim 1 wherein the first turn on delay timer and the second turn on delay timer each provide a turn on delay of at least 0.1 seconds.

8. A duplex encoder/decoder pair as claimed in claim 7 wherein the turn on delay is about 0.5 seconds.

9. A decoder half for a duplex decoder, for use with a duplex encoder, said duplex decoder half having an input connecting to a half wave rectifier having a half wave rectified output, said half wave rectified output leading to a switching circuit interfaced with a turn on delay timer to time out a predetermined period before operating said switching circuit on said half wave rectifier passing current at an operational voltage, the output of the switching circuit connecting to an output for connecting to a load and to a turn-off delay circuit comprising a diode and capacitor connected in parallel, connected in series with an inductor, which is connected across the load.

10. A control circuit as claimed in claim 9 wherein the value of the capacitor and the value of the inductor are selected to delay turn off of the relevant output by holding the output high for a period of at least 0.015 seconds.

11. A control circuit as claimed in claim 9 wherein the turn on delay timer provides a turn on delay of at least 0.1 seconds.

12. A duplex encoder/decoder pair as claimed in claim 11 wherein the turn on delay is about 0.5 seconds.

13. A duplex encoder/decoder pair as claimed in claim 9 wherein the turn on delay timer to time out a predetermined period before operating said switching circuit is a transistor based RC timer circuit.

14. A duplex encoder/decoder pair as claimed in claim 9 wherein the first switching circuit and the second switching circuit each use a low gate current triac.

15. A control circuit for a solenoid, said control circuit having an input connecting to a half wave rectifier having a half wave rectified output, said half wave rectified output leading to a switching circuit interfaced with a turn on delay timer to time out a predetermined period before operating said switching circuit on said half wave rectifier passing current at an operational voltage, the output of the switching circuit connecting to an output for connecting to a load in the form of said solenoid, said output having a turn-off delay circuit comprising a diode and capacitor connected in parallel, connected in series with an inductor, which when in circuit is connected across the load.

16. A control circuit as claimed in claim 15 wherein the value of the capacitor and the value of the inductor are selected to delay turn off of the relevant output by holding the output high for a period of at least 0.015 seconds.

17. A control circuit as claimed in claim 15 wherein the turn on delay timer provides a turn on delay of at least 0.1 seconds.

18. A duplex encoder/decoder pair as claimed in claim 17 wherein the turn on delay is about 0.5 seconds.

19. A duplex encoder/decoder pair as claimed in claim 15 wherein the turn on delay timer to time out a predetermined period before operating said switching circuit is a transistor based RC timer circuit.

20. A duplex encoder/decoder pair as claimed in claim 15 wherein the first switching circuit and the second switching circuit each use a low gate current triac.

* * * * *